United States Patent
Codilian et al.

(10) Patent No.: US 6,934,114 B1
(45) Date of Patent: Aug. 23, 2005

(54) REDUCED BIT NUMBER WEDGE IDENTIFICATION TECHNIQUES WITHIN A ROTATING MEDIA STORAGE DEVICE

(75) Inventors: Raffi Codilian, Irvine, CA (US); Ralph A. Proud, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 232 days.

(21) Appl. No.: 10/280,684

(22) Filed: Oct. 24, 2002

(51) Int. Cl.[7] .............................................. G11B 5/596
(52) U.S. Cl. .................................................. 360/77.08
(58) Field of Search ..................................... 360/77.08

(56) References Cited

U.S. PATENT DOCUMENTS 5,909,336 A * 6/1999 Schaffner et al. ......... 360/77.08
6,501,608 B2  12/2002 Buch

* cited by examiner

Primary Examiner—David Hudspeth
Assistant Examiner—Mitchell Slavitt
(74) Attorney, Agent, or Firm—Milad G. Shara, Esq.; Blakely, Sokoloff, Taylor & Zafman

(57) ABSTRACT

Reduced bit number wedge identification techniques for use within a rotating media storage device (RMSD) are disclosed. The RMSD includes a disk having a circumferential track that includes a plurality of embedded servo wedges utilized in track following. A substantial majority of the plurality of wedges include a reduced bit wedge ID field that does not have a sufficient number of bits to uniquely identify the wedge within the track. A combined wedge ID code is formed from reading at least first and second reduced bit wedge ID numbers from first and second wedges, respectively, which is used to uniquely identifying a wedge.

37 Claims, 10 Drawing Sheets

| Unique Wedge ID Number 500 | 1 | 2 | 3 | 4 | 5 | 6 | 7 | 8 | 9 | 10 | 11 | 12 | 13 |
|---|---|---|---|---|---|---|---|---|---|---|---|---|---|
| Old Prior Art Scheme: 502 | 0001 | 0010 | 0011 | 0100 | 0101 | 0110 | 0111 | 1000 | 1001 | 1010 | 1011 | 1100 | 1101 |
| Reduced Bit Wedge ID Numbers: 504 | 00 | 01 | 00 | 10 | 00 | 11 | 01 | 10 | 01 | 11 | 10 | 11 | 00 |
| Decoded Values: 506 | 0 | 1 | 4 | 2 | 8 | 3 | 13 | 6 | 9 | 7 | 14 | 11 | 12 |

FIG. 5A

Cyclic Coding Sequence — 514
0001001000110110011110 1100

| Combined Wedge ID Code Words | Decoded Wedge ID Codes | Unique Wedge ID Numbers |
|---|---|---|
| 0000 — 542 | 0 — 545 | 1 |
| 0001 — 525 | 1 — 547 | 2 |
| 0100 — 535 | 4 | 3 |
| 0010 | 2 | 4 |
| 1000 | 8 | 5 |
| 0011 | 3 | 6 |
| 1101 | 13 | 7 |
| 0110 | 6 | 8 |
| 1001 | 9 | 9 |
| 0111 | 7 | 10 |
| 1110 | 14 | 11 |
| 1011 | 11 | 12 |
| 1100 | 12 | 13 |

510 — Decoded Wedge ID Code Sequence

FIG. 5B

| Unique Wedge ID Number | 1 | 2 | 3 | 4 | 5 | 6 | 7 | 8 |
|---|---|---|---|---|---|---|---|---|
| Old Prior Art Schemes: | 000 | 001 | 010 | 011 | 100 | 101 | 110 | 111 |
| Reduced Bit Wedge ID Numbers: | 0 | 1 | 0 | 1 | 1 | 1 | 0 | 0 |
| Decoded Values: | 0 | 1 | 2 | 5 | 3 | 7 | 6 | 4 |

FIG. 5C

3 Bit Cyclic Coding Sequence = 00010111 — 559

| Combined Wedge ID Code Words | Decoded Wedge ID Codes | Unique Wedge ID Numbers |
|---|---|---|
| 000 | 0 | 1 |
| 001 — 574 | 1 | 2 |
| 010 — 575 | 2 | 3 |
| 101 — 585 | 5 | 4 |
| 011 | 3 | 5 |
| 111 | 7 | 6 |
| 110 | 6 | 7 |
| 100 | 4 | 8 |

FIG. 5D

REDUCED BIT NUMBER WEDGE IDENTIFICATION TECHNIQUES WITHIN A ROTATING MEDIA STORAGE DEVICE

BACKGROUND OF THE INVENTION

1. Field of the Invention

The present invention relates to rotating media storage devices (RMSDs). More particularly, the present invention relates to an RMSD that utilizes reduced bit number wedge identification techniques.

2. Description of the Prior Art and Related Information

Computer systems rely on rotating media storage devices (RMSDs), which often employ a moveable head actuator to frequently access large amounts of data stored on the media. One example of an RMSD is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the transducer head over a particular track on the disk to read or write information from that track.

Each surface of each disk conventionally contains a plurality of concentric data tracks angularly divided into a plurality of data sectors. In addition, special servo information is provided on each disk or on another disk to determine the position of the moveable transducer head. The most popular form of servo is called "embedded servo" wherein the servo information is written in a plurality of servo wedges that are angularly spaced from one another and interspersed between data sectors around each track of each disk. Each servo wedge generally comprises a track identification (ID) field, a wedge ID field having a unique binary encoded wedge ID number to uniquely identify the wedge, and a group of servo bursts (an alternating pattern of magnetic transitions) which the servo control system samples to align the moveable transducer head with or relative to a particular servo track or one or more corresponding data tracks.

The servo control system moves the transducer head toward a desired track during a coarse "seek" mode using the track ID field as a control input. Once the transducer head is generally over the desired track, the servo control system uses the servo bursts to keep the transducer head over that track in a fine "track follow" mode. The transducer head generally reads the servo bursts to produce a position error signal (PES).

Further, during track following mode, the moveable transducer head repeatedly reads the wedge ID field of each successive servo wedge to obtain the unique binary encoded wedge ID number that uniquely identifies each wedge of the track. In this way, the servo control system continuously knows where the moveable head is relative to the disk. Unfortunately, the unique binary encoded wedge ID number includes a relatively large number of bits to uniquely identify each wedge of the track. Today, in order to uniquely identify a wedge, the number of required bits are N; where N can be determined as: wedges $<=2^N$.

As an example, to uniquely identify up to eight wedges on a track, N must equal at least 3. In other words, each unique binary encoded wedge ID number requires at least three bits. Thus, a typical coding scheme would be (wedge #/unique binary encoded wedge ID number): 0/000; 1/001; 2/010; 3/011; 4/100; 5/101; 6/110; 7/111. Or as another example, for the case of identifying thirteen wedges on a track, N must equal at least 4. Thus, a typical coding scheme would be (wedge #/unique binary encoded wedge ID number): 0/0000; 1/0001; 2/0010; 3/0011; 4/0100; 5/0101; 6/0110; 7/0111; 8/1000; 9/1001; 10/1010; 11/1011; 12/1100. Of course for tracks with even more wedges, the unique binary encoded wedge ID numbers are even larger. For example, for the case where there are 256 wedges, N must equal at least 8. However, at the same time, in the very competitive disk drive market, disk drive manufacturers are continuously striving to reduce overhead data stored in the servo wedges in order to free up more disk space for storing data in the data sectors around each track of the disk.

SUMMARY OF THE INVENTION

The present invention relates to reduced bit number wedge identification techniques for use within a rotating media storage device (RMSD).

In one aspect, the invention may be regarded as an RMSD connectable to a host computer. The RMSD includes a moveable head to perform track following and a disk. The disk includes a circumferential track that has a plurality of embedded servo wedges utilized in track following. The plurality of wedges are spaced sequentially around a circumference of the circumferential track. A substantial majority of the plurality of embedded servo wedges include a reduced bit servo wedge ID field that does not have a sufficient number of bits to uniquely identify the wedge within the track.

In one embodiment, the RMSD further includes a microprocessor for controlling operations in the RMSD including track following and wedge identification operations. The microprocessor under the control of a program reads a first reduced bit wedge ID field of a first embedded servo wedge to obtain a first reduced bit wedge ID number and reads a second reduced bit wedge ID field of a second embedded servo wedge to obtain a second reduced bit wedge ID number. The microprocessor under the control of the program forms a combined wedge ID code word from at least the read first and second reduced bit wedge ID numbers for use in uniquely identifying the wedge. The combined wedge ID code word can then be associated with a unique wedge ID number of the track.

In a further embodiment, associating the combined wedge ID code word with a unique wedge ID number further includes associating the combined wedge ID code word with a decoded wedge ID code of a decoded wedge ID code sequence. Additionally, associating the combined wedge ID code word with a unique wedge ID number may also further include associating the decoded wedge ID code with the unique wedge ID number. Moreover, in a more particular embodiment, the decoded wedge ID code is associated in a look-up table with the unique wedge ID number. The decoded wedge ID code sequence may be based on a cyclic bit coding sequence. Also, a history buffer may be used to store the first and second reduced bit wedge ID numbers.

In an additional embodiment, a confidence counter may be used in performing error recovery. If a read reduced bit wedge ID field is not equal to a predicted reduced bit wedge ID field, then the confidence counter is reduced in value. On the other hand, if a read reduced bit wedge ID field is equal to a predicted reduced bit wedge ID field, then the confidence counter is increased in value. Further, if a wedge acquire flag is set, which indicates that a full wedge ID is incomplete, then a wedge ID complete value is continued to be formed and the confidence counter is increased in value.

In a further aspect, the invention may be regarded as a method for uniquely identifying a wedge within a track of a disk of an RMSD. The method comprises the steps of reading a first reduced bit wedge ID field of a first embedded servo wedge to obtain a first reduced bit wedge ID number and reading a second reduced bit wedge ID field of a second embedded servo wedge to obtain a second reduced bit wedge ID number. The method further comprises the step of forming a combined wedge ID code word from at least the read first and second reduced bit wedge ID numbers for use in uniquely identifying the wedge. The combined wedge ID code word may then be associated with a unique wedge ID number of the track.

In yet another aspect, the invention may be regarded as a computer system including a host computer and an RMSD, in which the RMSD further comprises a moveable head to perform track following and a disk. The disk includes a circumferential track that has a plurality of embedded servo wedges utilized in track following. The plurality of wedges are spaced sequentially around a circumference of the circumferential track. A substantial majority of the plurality of embedded servo wedges include a reduced bit servo wedge ID field that does not have a sufficient number of bits to uniquely identify the wedge within the track.

The foregoing and other features of the invention are described in detail below and set forth in the appended claims.

BRIEF DESCRIPTION OF THE DRAWINGS

FIGS. 5A and 5B show diagrams illustrating an example of the method for implementing reduced bit number wedge identification techniques for a 13 wedge example, according to one embodiment of the present invention.

FIGS. 5C and 5D show diagrams illustrating another example of the method for implementing reduced bit number wedge identification techniques for a 8 wedge example, according to one embodiment of the present invention.

DETAILED DESCRIPTION

Figure 1:
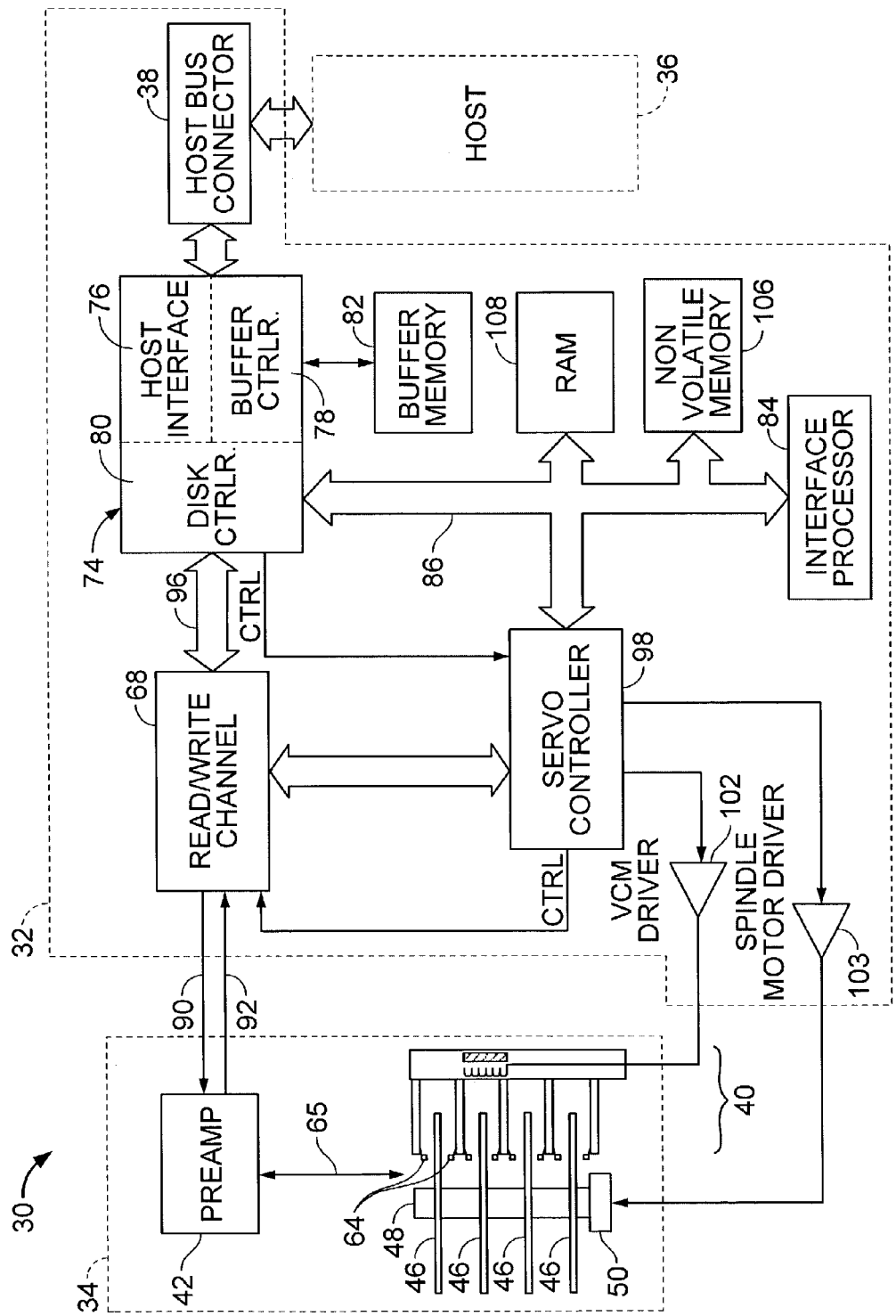
FIG. 1 shows a block diagram of a rotating media storage device (RMSD), such as disk drive, in which the invention may be practiced.

FIG. 1 shows a block diagram of a rotating media storage device (RMSD), such as disk drive 30, in which the invention may be practiced. Disk drive 30 is connected to a host computer 36 via host bus connector 38 for the transfer of commands, status and data. One suitable standard for such connection is the Advance Technology Attachment (ATA) standard presently favored for desktop personal computers. Disk drive 30 comprises a Head/Disk Assembly, HDA 34, and a controller printed circuit board assembly, PCBA 32.

HDA 34 comprises: one or more disks 46 for data storage; a spindle motor 50 for rapidly spinning each disk 46 (four shown) on a spindle 48; and an actuator assembly 40 for moving a plurality of heads 64 in unison over each disk 46. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 comprises a read/write channel 68, servo controller 98, host interface and disk controller HIDC 74, voice coil motor driver VCM 102, spindle motor driver SMD 103, microprocessor 84, and several memory arrays—buffer or cache memory 82, RAM 108, and non-volatile memory 106.

Host initiated operations for reading and writing data in disk drive 30 are executed under control of microprocessor 84 connected to the controllers and memory arrays via a bus 86. Program code executed by microprocessor 84 is stored in non-volatile memory 106 and random access memory RAM 108. Program overlay code stored on reserved tracks of disks 46 may also be loaded into RAM 108 as required for execution. In particular, as described in detail below, microprocessor 84 under the control of a program or routine executes the method of the invention.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Preferably, channel 68 employs PRML (partial response maximum likelihood) coding techniques, although the invention may be practiced with equal advantage using other coding processes.

HIDC 74 comprises a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

A servo controller 98 provides an interface between microprocessor 84 and actuator assembly 40 and spindle motor 50. Microprocessor 84 commands logic in servo controller 98 to position actuator 40 using a VCM driver 102 and to precisely control the rotation of spindle motor 50 with a spindle motor driver 103.

Preferably, disk drive 30 employs a sampled servo system in which equally spaced servo wedge sectors (sometimes termed "servo wedges") are recorded on each track of each disk 46. Data sectors are recorded in the intervals between servo sectors on each track. Servo sectors are sampled at regular intervals to provide servo position information to microprocessor 84. Servo sectors are received by channel 68, and are processed by servo controller 98 to provide position information to microprocessor 84 via bus 86.

Figure 2:
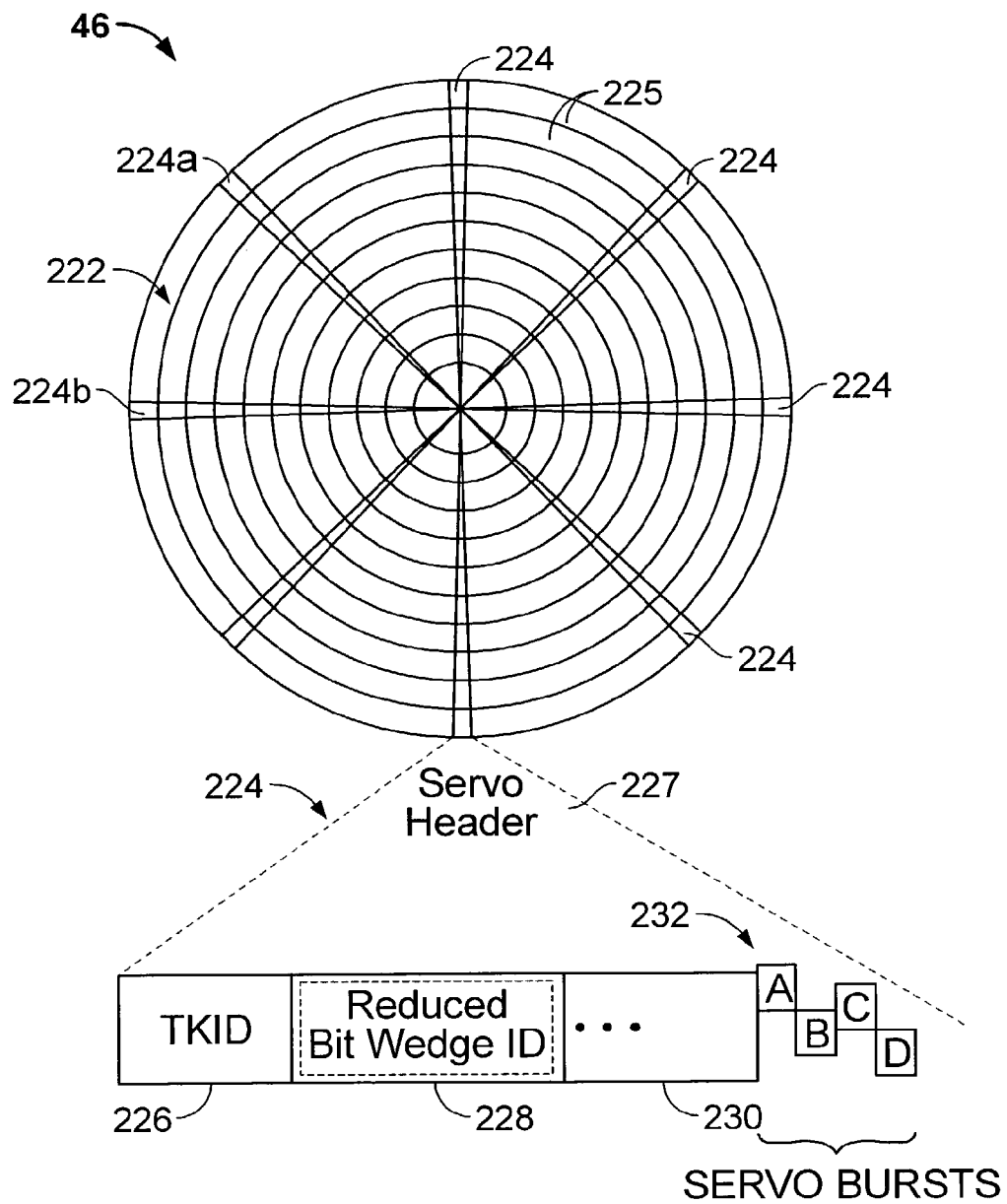
FIG. 2 shows a disk of a disk drive have a plurality of concentric tracks and particularly illustrates a reduced bit wedge ID field, according to one embodiment of the present invention.

Turning now to FIG. 2, FIG. 2 shows a disk 46 of the previously described disk drive 30 having a plurality of concentric tracks 222 and particularly illustrates a reduced bit wedge ID field 228. The disk 46 includes a plurality of concentric circumferential tracks 222 wherein each circumferential track 222 includes a plurality of embedded servo wedges 224 utilized in track following. The plurality of servo wedges 224 are spaced sequentially around a circumference of the circumferential track 222. The embedded servo wedges 224 contain servo information utilized in track following and are interspersed between data regions 225 of the disk 46. Data is conventionally written in the data regions 225 in a plurality of discrete data sectors. Each data region 225 is typically preceded by a servo wedge 224.

Typically, each servo wedge generally comprises a servo header 227 containing a track identification (TKID) field 226, a wedge number field, and other data 230, followed by least two angularly successive servo burst regions 232 that define a plurality of burst pair centerlines. As is known in the art, each servo burst is conventionally formed from a series of magnetic transitions defined by alternating patterns of magnetic domains. The servo control system of the disk drive samples servo bursts with a read transducer of the moveable head to align the transducer with or relative to a burst pair centerline and, therefore, with or relative to a particular data track 225. In the prior art, the wedge number field includes a relatively large number of bits to uniquely identify the wedge of the track However, in one embodiment of the present invention, a substantial majority of the plurality of embedded servo wedges 224 include a servo header 227 having a reduced bit servo wedge ID field 228 that does not have a sufficient number of bits to uniquely identify the wedge 224 within the track. Nonetheless, the present invention uses reduced bit number wedge identification techniques to utilize reduced bit servo wedge ID fields 228 in order to uniquely identify a wedge within a track. Advantageously, by utilizing a plurality of reduced bit wedge ID fields to uniquely identify a wedge within a track, as opposed to a single relatively large wedge ID field that uniquely identifies that specific wedge within the track, more disk space on the track can be utilized for storing data.

In one embodiment, the rotating media storage device (RMSD), e.g. disk drive 30, uses microprocessor 84 for controlling operations in the disk drive 30 including track following and wedge identification operations. The microprocessor 84 under the control the program reads a first reduced bit wedge ID field 228 of a first embedded servo wedge 224a to obtain a first reduced bit wedge ID number and reads a second reduced bit wedge ID field 228 of a second embedded servo wedge 224b to obtain a second reduced bit wedge ID number. The microprocessor 84 under the control of the program forms a combined wedge ID code word from at least the read first and second reduced bit wedge ID numbers for use in uniquely identifying the wedge. The combined wedge ID code word, as will be discussed, can then be associated with a unique wedge ID number of the track.

Figure 3:
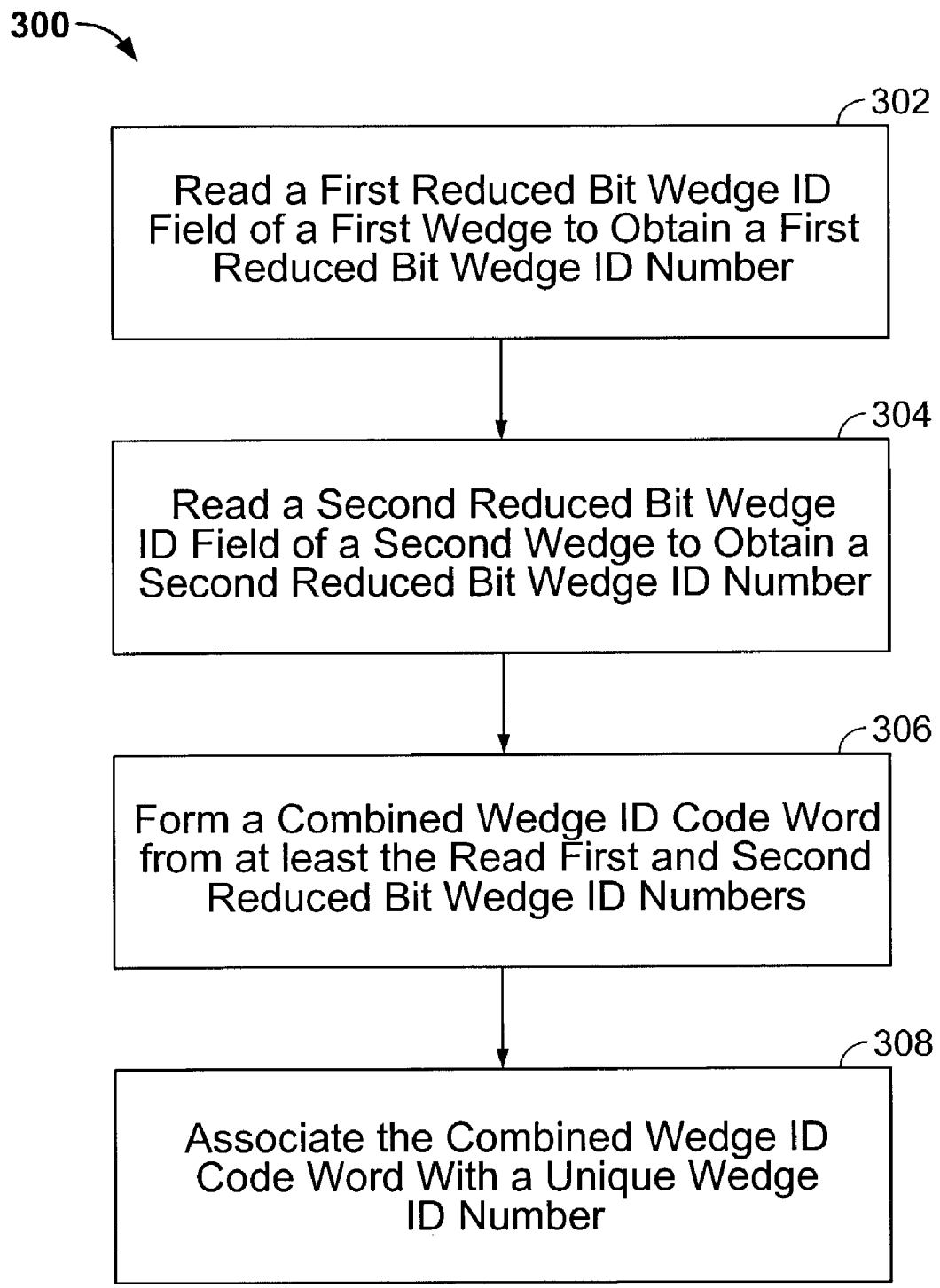
FIG. 3 is a flowchart of a method for implementing reduced bit number wedge identification techniques within an RMSD, according to one embodiment of the present invention.

Now turning to FIG. 3, a flowchart of a method 300 of the invention for implementing reduced bit number wedge identification techniques within an RMSD is illustrated. At step 302, a first reduced bit wedge ID field 228 of a first embedded servo wedge 224a is read in order to obtain a first reduced bit wedge ID number. Next, at step 304, a second reduced bit wedge ID field 228 of a second embedded servo wedge 224b is read in order to obtain a second reduced bit wedge ID number. At step 306, a combined wedge ID code word is formed from at least the read first and second reduced bit wedge ID numbers. Then, at step 308, the combined wedge ID code word is associated with a unique wedge ID number.

Figure 4:
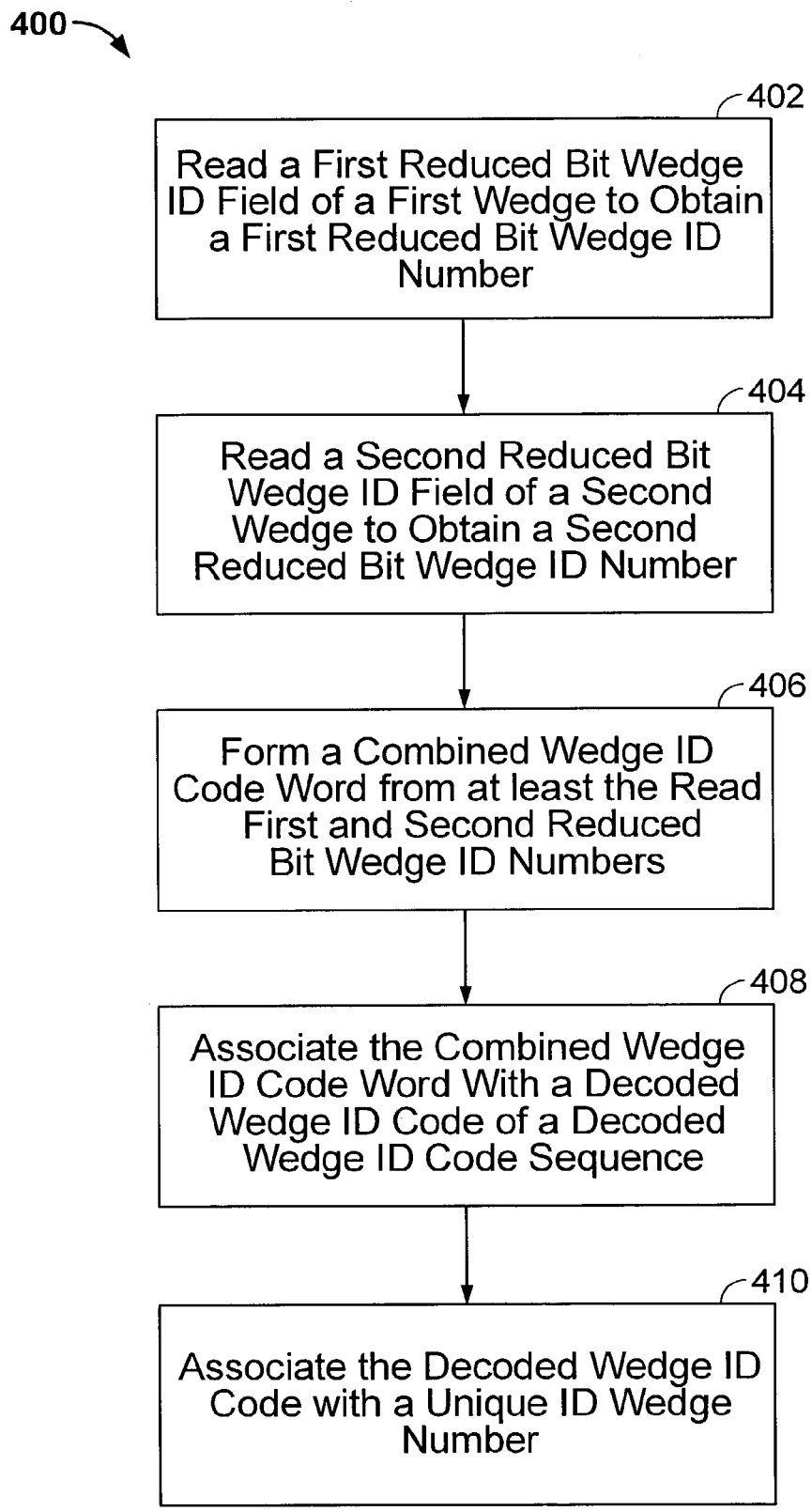
FIG. 4 is a flowchart of a more detailed method for implementing reduced bit number wedge identification techniques within an RMSD, according to one embodiment of the present invention.

Referring now to FIG. 4, a flowchart of a more detailed method 400 of another embodiment of the invention for implementing reduced bit number wedge identification techniques within an RMSD is illustrated. At step 402, a first reduced bit wedge ID field 228 of a first embedded servo wedge 224a is read in order to obtain a first reduced bit wedge ID number. Next, at step 404, a second reduced bit wedge ID field 228 of a embedded servo wedge 224b is read in order to obtain a second reduced bit wedge ID number. At step 406, a combined wedge ID code word is formed from at least the read first and second reduced bit wedge ID numbers. Next, at step 408, the combined wedge ID code word is associated with a decoded wedge ID code of a decoded wedge ID code sequence. Then, at step 410, the decoded wedge ID code is associated with a unique wedge ID number. Examples of the method of the invention for implementing reduced bit number wedge identification techniques within an RMSD will be illustrated later in greater detail with reference to FIGS. 5A–5D. It should be appreciated that the method of the invention for implementing reduced bit number wedge identification techniques within an RMSD can be implemented in hardware, software, firmware or a combination thereof in the PCBA 32 of the disk drive 30.

With reference now to FIGS. 5A and 5B, FIGS. 5A and 5B are diagrams illustrating an example of the method for implementing reduced bit number wedge identification techniques. In this particular example, a 13-wedge example is illustrated. FIGS. 5A and 5B show unique wedge ID numbers 500 versus an old prior art scheme of wedge identification 502, reduced bit wedge ID numbers for wedge identification 504, decoded wedge ID codes 506, a decoded wedge ID code sequence 510, combined wedge ID code words 512, and a cyclic coding sequence 514. Using FIGS. 5A and 5B, a method for implementing reduced bit number wedge identification techniques will now be discussed in more detail.

For example, in implementing the method, a first reduced bit wedge ID number 520 is obtained by reading a first reduced bit wedge ID field 228 of a first embedded servo wedge 224a (see also FIG. 2). Next, a second reduced bit wedge ID number 522 is obtained by reading a second reduced bit wedge ID field 228 of a second embedded servo wedge 224b (see also FIG. 2). Next, a combined wedge ID code word 525 from at least the read first and second reduced bit wedge ID numbers 520 and 522 is formed for uniquely identifying the wedge (i.e. as one of the unique wedge ID numbers 500). As particularly illustrated in FIG. 5B, the combined wedge ID code word 0001 has been formed which is associated to the unique wedge ID number 2.

As another example, in implementing the method, a first reduced bit wedge ID number 522 is obtained by reading a first reduced bit wedge ID field 228 of a second embedded servo wedge 224a. Next, a second reduced bit wedge ID number 532 is obtained by reading a first reduced bit wedge ID field 228 of a second embedded servo wedge 224b. Next, a combined wedge ID code word 535 from at least the first and second reduced bit wedge ID numbers 522 and 532 is formed for uniquely identifying the wedge (i.e. as one of the unique wedge ID numbers 500). As particularly illustrated in FIG. 5B, the combined wedge ID code word 0100 has been formed which is associated to the unique wedge ID number 3.

As should be appreciated from FIGS. 5A and 5B, this process is repeatable. This is because the method for implementing reduced bit number wedge identification is based on a cyclic coding sequence 514 that simply repeats over and over. For example, as shown in FIGS. 5A and 5B, for unique wedge ID number 1, which follows unique wedge ID number 13, the first reduced bit wedge ID number 540 is followed by second reduced bit wedge ID number 520 (i.e. showing that the cyclic coding sequence is indeed repetitive) such that the combined wedge ID code word 0000 (542) is formed which is associated to unique wedge ID number 1.

In a further embodiment, associating a combined wedge ID code word 512 with a unique wedge ID number 500 further includes associating the combined wedge ID code word 512 with a decoded wedge ID code 506 of the decoded wedge ID code sequence 510 and then further associating the decoded wedge ID code 506 with a unique wedge ID number 500. For example, in the case of the previously described combined wedge ID code word 0001 (525), which was formed by first and second reduced bit wedge ID numbers 520 and 522, respectively, the associated decoded wedge ID code is 1 (545). As particularly illustrated in FIG. 5B, this associated decoded wedge ID code of 1 is further associated with the unique wedge ID number 2. As another example, in the case of the previously described combined wedge ID code word 0100 (535), which was formed by first and second reduced bit wedge ID numbers 522 and 532, respectively, the associated decoded wedge ID code is 4 (547). In one embodiment, the decoded wedge ID code may be the decimal equivalent of the binary combined wedge ID code word. As particularly illustrated in FIG. 5B, this associated decoded wedge ID code of 4 (547) is further associated with the unique wedge ID number 3. As can be seen in FIG. 5B, the decoded wedge ID code sequence 510 is based on the cyclic bit coding sequence 514, and like the cyclic bit coding sequence 514, simply repeats over and over again.

Thus, as illustrated by FIGS. 5A and 5B, a wedge can be uniquely identified by its unique wedge ID number 500 using two samples of a reduced bit wedge ID number 504 (e.g. first and second reduced bit wedge ID numbers) wherein each reduced bit wedge ID number only uses two bits. This is opposed to the old prior art scheme 502 in which four bits are used to uniquely identify each wedge. In this way, the number of bits used in wedge identification is one-half of that required by the old prior art scheme. Further, once a wedge has been uniquely identified by its unique wedge ID number, subsequent wedges are thereafter predictable. Advantageously, by utilizing a plurality of reduced bit wedge ID fields to uniquely identify a wedge within a track, as opposed to a single relatively large wedge ID field that uniquely identifies that specific wedge within the track, more disk space on the track can be utilized for storing data. However, the present method requires two samples, thus requiring more processing. Nonetheless, this is not problematic due to the fact that typically when a movable head of a disk drive is seeking and settling to a track, a certain number of embedded servo wedges are read anyway. During this time, the processor initiates this somewhat more complex reduced bit number wedge identification methodology.

Figure 6:
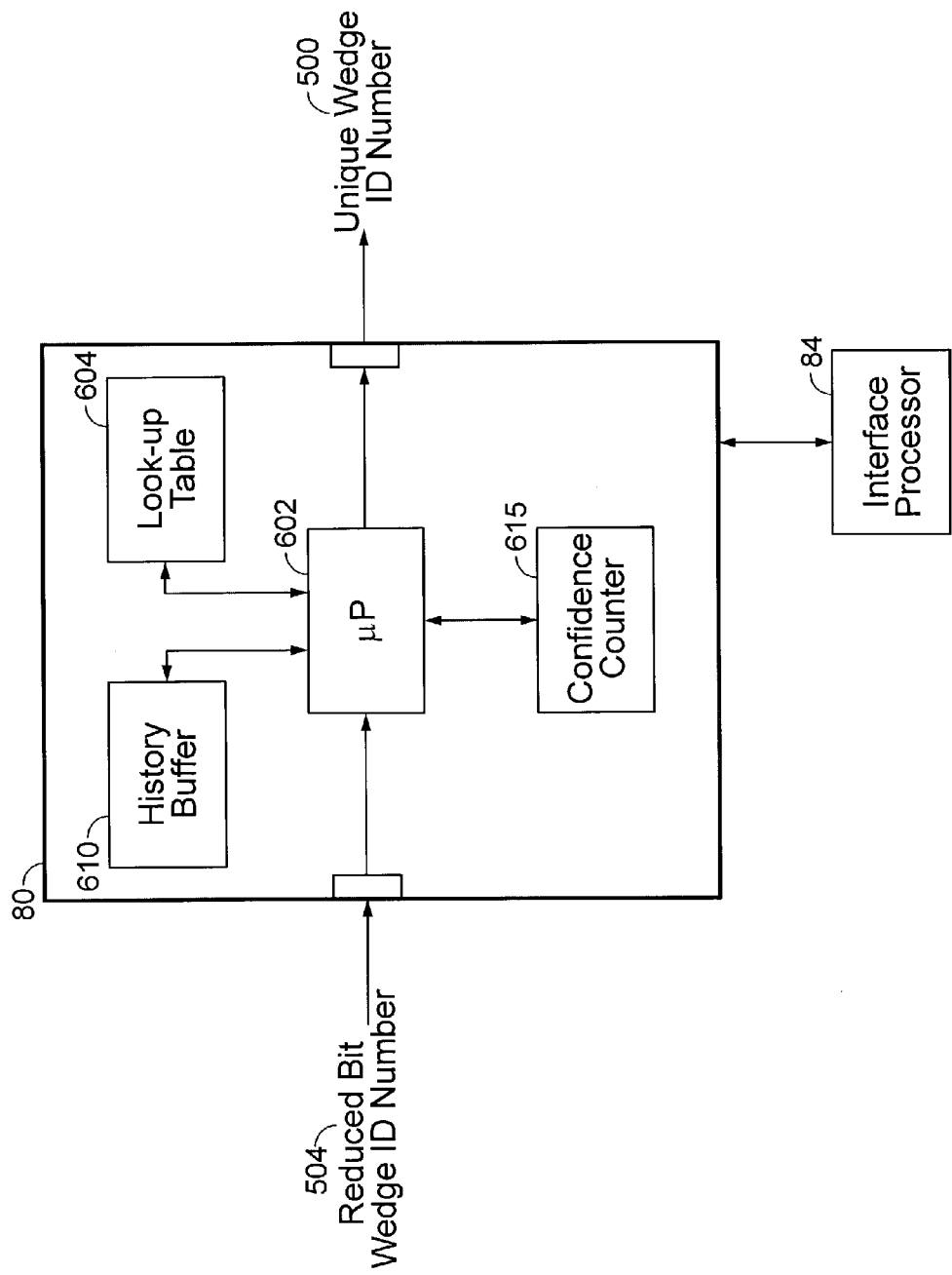
FIG. 6 is a block diagram of components useful in implementing reduced bit number wedge identification techniques, according to one embodiment of the present invention.

Turning now to FIG. 6, a block diagram of components useful in implementing reduced bit number wedge identification techniques is illustrated. As shown in FIG. 6, a history buffer 610, a look-up table 604, and a confidence counter 615 are coupled to one another via a microprocessor 602. In one embodiment, these components may be located in the disk controller 80 of the PCBA 32 of the disk drive 30, which is in turn coupled to the microprocessor 84. Utilizing these components reduced bit wedge ID numbers can be correlated with a unique wedge ID number. It should be appreciated that these components may be located anywhere within the PCBA 32 of the disk drive 30 and are not necessarily located in the disk controller 80. Further, it should be appreciated that these functional components can be implemented in hardware, software, firmware or a combination thereof in the PCBA 32 of the disk drive 30.

Looking at FIG. 6 in conjunction with FIGS. 5A and 5B, reduced bit wedge ID numbers 504 enter the disk controller 80. For example, initially, a first reduced bit wedge ID number 520 may be obtained by reading a first reduced bit wedge ID field 228 of a first embedded servo wedge 224a. Next, a second reduced bit wedge ID number 522 may be obtained by reading a second reduced bit wedge ID field 228 of a second embedded servo wedge 224b. The history buffer 80 may be used to store the first and second reduced bit wedge ID numbers 520 and 522. Next, a combined wedge ID code word 512 from at least the read first and second reduced bit wedge ID numbers 520 and 522 is formed. This can be accomplished by either microprocessor 602 or microprocessor 84. As particularly illustrated in FIG. 5B, the combined wedge ID code word 0001 (525) is formed. Next the combined wedge ID word 525 is associated with a decoded wedge ID code 506 of the decoded wedge ID code sequence 510 and the decoded wedge ID code is then further associated with a unique wedge ID number 500. For example, combined wedge ID code word 0001 (525) is associated with decoded wedge ID code 1 (545). This association can be accomplished by utilizing look-up table 604. Also, as particularly illustrated in FIG. 5B, this associated decoded wedge ID code of 1 (545) is further associated with the unique wedge ID number 2. This association can also be accomplished by utilizing look-up table 604. The determined unique wedge ID number 500 may then be outputted from the disk controller 80 for further processing.

As another example, continuing with FIG. 6 in conjunction with FIGS. 5A and 5B, a reduced bit wedge ID number 504 enters the disk controller 80. For example, a reduced bit wedge ID number 532 may be obtained by reading a reduced bit wedge ID field 228 of a next embedded servo wedge 224. The history buffer 610 is already storing the previous first and second reduced bit wedge ID numbers 520 and 522. The second reduced bit wedge ID number 522 now becomes the first reduced bit wedge ID number and the most recently read reduced bit wedge number, e.g. reduced bit wedge number 532, now becomes the second reduced bit wedge number. Next, a combined wedge ID code word 535 from at least the first and second reduced bit wedge ID numbers 522 and 532 is formed. This can be accomplished by either microprocessor 602 or microprocessor 84. As particularly illustrated in FIG. 5B, the combined wedge ID code word 0100 (535) is formed. Next, the combined wedge ID word 535 is associated with a decoded wedge ID code 506 of the decoded wedge ID code sequence 510 and decoded wedge ID code 506 is then further associated with a unique wedge ID number 500. For example, combined wedge ID code word 0100 (535) is associated with decoded wedge ID code 4 (547). This association can also be accomplished by utilizing look-up table 604. Also, as particularly illustrated in FIG. 5B, this associated decoded wedge ID code of 4 is further associated with the unique wedge ID number 3. This association can be accomplished by utilizing look-up table 604. The determined unique wedge ID number 500 may then be outputted from the disk controller 80 for further processing.

With reference now to FIGS. 5C and 5D, FIGS. 5C and 5D are diagrams illustrating another example of the method for implementing reduced bit number wedge identification techniques. In this particular example, an 8-wedge example is illustrated, utilizing a 3-bit cyclic coding sequence. FIGS. 5C and 5D show unique wedge ID numbers 550 versus an old prior art scheme of wedge identification 552, reduced bit wedge ID numbers 554 for wedge identification, decoded wedge ID codes 556, a decoded wedge ID code sequence 560, combined wedge ID code words 558, and a 3-bit cyclic coding sequence 559. Using FIGS. 5C and 5D, another example of the method for implementing reduced bit number wedge identification techniques will now be discussed.

For example, in implementing the method, a first reduced bit wedge ID number 562 is obtained by reading a first reduced bit wedge ID field of a first embedded servo wedge, a second reduced bit wedge ID number 563 is obtained by reading a second reduced bit wedge ID field of a second embedded servo wedge, and a third reduced bit wedge ID number 565 is obtained by reading a third reduced bit wedge ID field of a third embedded servo wedge. Next, a combined wedge ID code word 575 from the first, second and third reduced bit wedge ID numbers 562, 563, and 565 is formed for uniquely identifying the wedge (i.e. by one of the unique wedge ID numbers 550). As particularly illustrated in FIG. 5D, the combined wedge ID code word 010 has been formed which is associated to the unique wedge ID number 3.

As another example, in implementing the method, a first reduced bit wedge ID number 563 is obtained by reading a first reduced bit wedge ID field of a first embedded servo wedge, a second reduced bit wedge ID number 565 is obtained by reading a second reduced bit wedge ID field of a second embedded servo wedge, and a third reduced bit wedge ID number 566 is obtained by reading a third reduced bit wedge ID field of a third embedded servo wedge. Next, a combined wedge ID code word 585 from the first, second and third reduced bit wedge ID numbers 563, 565, and 566 is formed for uniquely identifying the wedge (i.e. by one of the unique wedge ID numbers 550). As particularly illustrated in FIG. 5D, the combined wedge ID code word 101 has been formed which is associated to the unique wedge ID number 4.

As should be appreciated from FIGS. 5C and 5D, this process is repeatable. This is because the method for implementing reduced bit number wedge identification is based on a 3-bit cyclic coding sequence 559 that simply repeats over and over. For example, as shown in FIGS. 5C and 5D, for unique wedge ID number 1 which follows unique wedge ID number 8, first reduced bit wedge ID number 561 is followed by second reduced bit wedge ID number 562 which is then followed by third reduced bit wedge ID number 563 (i.e. showing that the 3-bit cyclic coding sequence is indeed repetitive) such that the combined wedge ID code word 001 (574) is formed which is associated to unique wedge ID number 2.

In a further embodiment, associating the combined wedge ID code word 575 with a unique wedge ID number 500 further includes associating the combined wedge ID code word 575 with a decoded wedge ID code 556 of the decoded wedge ID code sequence 560 and then further associating the decoded wedge ID code 556 with a unique wedge ID number 550. For example, in the case of the previously described combined wedge ID code word 010 (575), which was formed by first, second, and third reduced bit wedge ID numbers 562, 563, and 565, respectively, the associated decoded wedge ID code is 2 (587). The decoded wedge ID code may be the decimal equivalent of the binary combined wedge ID code word. As illustrated in FIG. 5D, this associated decoded wedge ID code of 2 is further associated with the unique wedge ID number 3. As another example, in the case of the previously described combined wedge ID code word 101 (585), which was formed by first, second, and third reduced bit wedge ID numbers 563, 565, and 566, respectively, the associated decoded wedge ID code is 5 (589). As illustrated in FIG. 5D, this associated decoded wedge ID code of 5 is further associated with the unique wedge ID number 4. As can be seen in FIG. 5D, the decoded wedge ID code sequence 560 is based on the 3-bit cyclic bit coding sequence 559 and like the 3-bit cyclic bit coding sequence 559, as previously discussed, simply repeats over and over. It should be appreciated to those skilled in the art that the 3-bit cyclic coding sequence can be implemented by the structure illustrated in FIG. 6, as previously discussed.

Thus, as illustrated by FIGS. 5C and 5D, a wedge can be uniquely identified using three samples of a reduced bit wedge ID number 554 (e.g. a first, second, and third reduced bit wedge ID number) wherein each reduced bit wedge ID number only uses one bit. This is opposed to the old prior art scheme 552 in which three bits are used to uniquely identifying each wedge. In this way, the number of bits used in wedge identification is one-third of that required by the prior art scheme. Further, once a wedge has been uniquely identified by its unique wedge ID number, subsequent wedge are thereafter predictable. Advantageously, by utilizing a plurality of reduced bit wedge ID fields to uniquely identify a wedge within a track, as opposed to a single relatively large wedge ID field that uniquely identifies that specific wedge within the track, more disk space on the track can be utilized for storing data. However, the present method requires three samples thus requiring more processing. Nonetheless, this is not problematic due to the fact that typically when a movable head of a disk drive is seeking and settling to a track, a certain number of embedded servo wedges are read anyway. During this time, the processor initiates this somewhat more complex reduced bit number wedge identification methodology.

Accordingly, by utilizing a history of previous reduced bit wedge ID numbers from previous wedges a current wedge can be uniquely identified. In order to accomplish this, cyclic coding sequences are utilized. Two examples of cyclic coding sequences 514 and 559, were previously discussed in detail with reference to FIGS. 5A, 5B and 5C, 5D, respectively. However, it should be appreciated to those skilled in the art that these are merely examples of cyclic coding sequences and that any practical cyclic coding sequence can be utilized. Further, although FIGS. 5A, 5B and 5C, 5D only illustrated thirteen wedge and eight wedge examples, respectively, it should be appreciated that these examples were only for illustrative purposes and that the method for implementing reduced bit number wedge identification techniques can be applied to other numbers of wedges. For ease of reference, sequences (S) can be identified as $S_{K,Q}$; where K denotes the number of wedges that are required to be read to uniquely identify the current wedge (i.e. form a combined wedge ID code word), and Q denotes the number of bits that are used in the reduced bit wedge ID number field for each wedge. For example, the thirteen wedge example of FIGS. 5A and 5B would be denoted as $S_{2,2}$ and the eight wedge example of FIGS. 5C and 5D would be denoted as $S_{3,1}$.

As previously described, a wide variety of cyclic coding sequences may be used, and some further examples will be briefly given here. For example, for up to a 16-wedge case utilizing 1 bit per wedge in the reduced bit wedge ID number field, four bit cyclic coding sequences may be used, such as the following examples:

1010110010000111 $S_{4,1}$

1110000100110101 $S_{4,1}$

As another example, for up to a 32-wedge case utilizing 1 bit per wedge in the reduced bit wedge ID number field, five bit cyclic coding sequences may be used, such as the following examples:

11001101001000001010111011000111 $S_{5,1}$
11100011011101010000010010110011 $S_{5,1}$
10001010110100000110010011111011 $S_{5,1}$
10011100000110101001000101111101 $S_{5,1}$
10111110100010010101100000111001 $S_{5,1}$
11011111001001100000101101010001 $S_{5,1}$

However, as previously discussed, it should be appreciated by those skilled in the art that any practical cyclic coding sequence to implement the previously described invention for reduced bit number wedge identification techniques may be used, and the previous examples are only for illustrative purposes.

Further, as previously discussed, once a wedge has been uniquely identified by its unique wedge ID number utilizing reduced bit number wedge identification techniques, subsequent wedges are thereafter predictable. Subsequent wedges may be predictable based on the cyclic coding sequence (e.g. the combined wedge ID code word), the decoded wedge ID code sequence, or the typically sequential unique wedge ID number sequence itself; since all of these sequences are interrelated as previously discussed.

Figure 7:
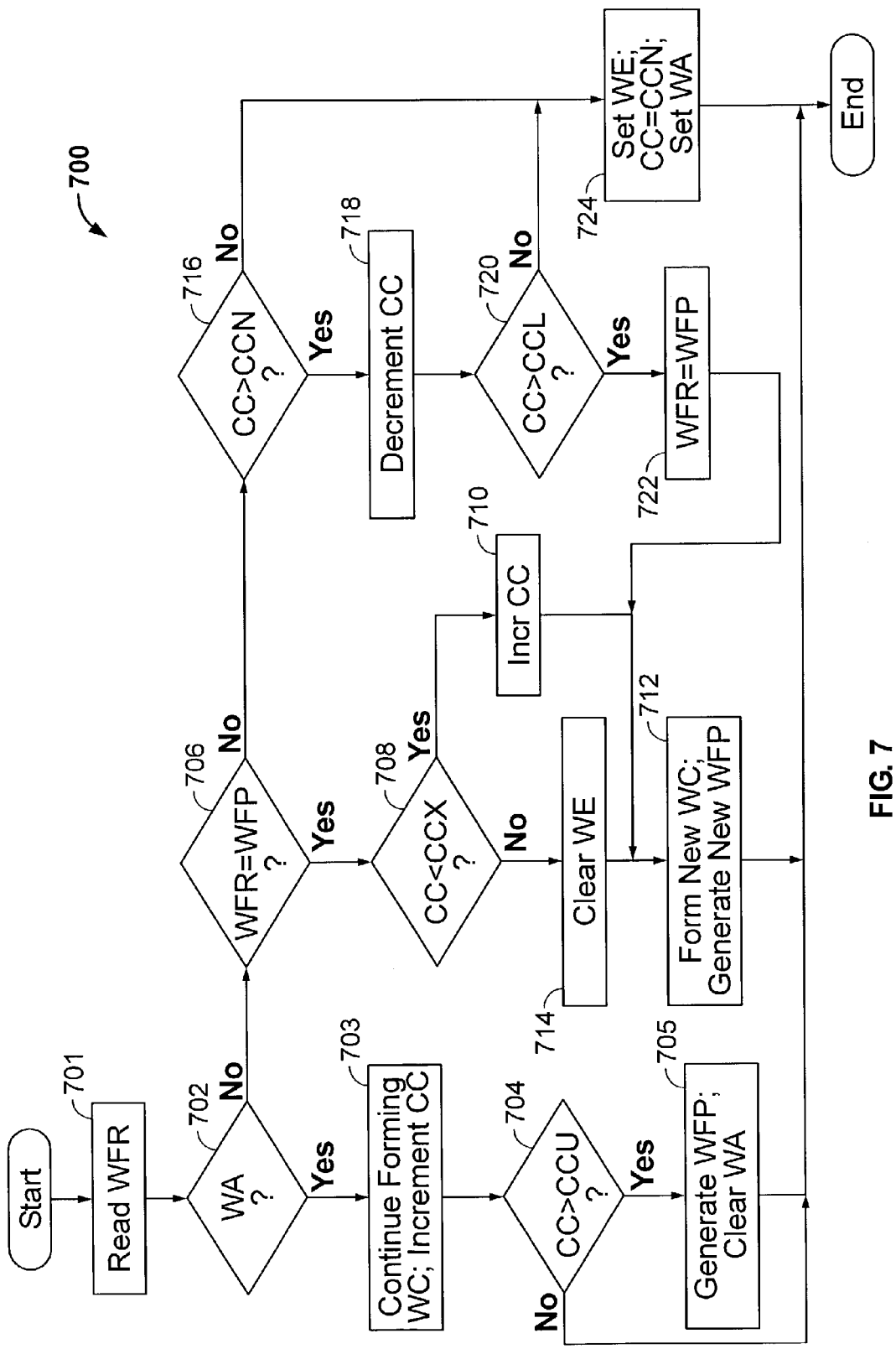
FIG. 7 is a flowchart of a method for error recovery, according to one embodiment of the present invention.

With reference now to FIG. 7, FIG. 7 is a flowchart illustrating a method 700 for error recovery. At step 701, a reduced bit wedge ID field is read (WFR). Next, at step 702, it is determined whether or not a wedge acquire (WA) flag is set. The WA flag, when set, indicates that the full wedge ID is incomplete (i.e. the unique wedge ID number has not yet been determined). A wedge ID complete (WC) value is the full value needed to uniquely identify the wedge. For example, in one embodiment, the WC value may be a combined wedge ID code based on a cyclic coding sequence, as previously discussed.

If the WA flag is set (i.e. indicating that the full wedge ID is incomplete), then at step 703 the wedge ID complete (WC) value is continued to be formed and the confidence count (CC) is incremented. For example, in one embodiment, in which the WC value is the same as the combined wedge ID code word, the WC value is continued to be formed by reading another reduced bit wedge ID field. Next, at step 704, it is determined whether the confidence count (CC) is greater than a confidence count upper threshold (CCU). If so, at block 705, a wedge ID field as predicted (WFP) is generated and the wedge ID acquire (WA) flag is cleared. In general, the confidence count upper threshold (CCU) should be greater than or equal to the number of wedges required to be read (e.g. the number of reduced bit wedge ID fields to be read) in order to form the wedge ID complete (WC) value (e.g. the combined wedge ID code word). In one embodiment, the confidence count can be implemented utilizing the confidence counter 615 of FIG. 6. Further, the confidence count (CC) value can be made available to other program segments for use as desired.

Returning again to step 702, if it is determined that the WA flag is not set (i.e. indicating that the full wedge ID is complete), then at step 706 it is next determined whether the reduced bit wedge ID field as read (WFR) is equal to the reduced bit wedge ID field as predicted (WFP).

If so, at step 708, it is determined whether a confidence count (CC) is less than a confidence count maximum (CCX). If the confidence count (CC) is greater than the confidence count maximum (CCX) then it can be assumed, with confidence, that the calculated wedge ID is accurate. Accordingly, at step 714, a wedge ID error flag (WE) is cleared. The wedge ID error flag (WE) indicates that the wedge ID complete (WC) value is unreliable. Then, at step 712, a new wedge ID complete (WC) value is formed and a new predicted wedge ID field (WFP) is generated.

On the other hand, if at step 708 the confidence count (CC) is less than the confidence count maximum (CCX), then at step 710 the confidence count (CC) is increased. Then, at step 712, a new wedge ID complete (WC) value is formed and a new predicted wedge ID field (WFP) is generated.

Returning to step 706, if it is determined that the reduced bit wedge ID field as read (WFR) is not equal to the reduced bit wedge ID field as predicted (WFP), then it is next determined at step 716 whether the confidence count (CC) is greater than a confidence count minimum (CCN). If the confidence count (CC) is greater than the confidence count minimum (CCN), then at step 718 the confidence count (CC) is decremented. Next, at step 720, it is determined whether the confidence count (CC) is greater than a confidence count lower threshold (CCL). If so, at step 722 the wedge ID field as read (WFR) is set equal to the wedge ID field as predicted (WFP) and then, at step 712, a new wedge ID complete (WC) value is formed and a new predicted wedge ID field (WFP) is generated. If not, at step 724, the wedge ID error flag (WE) is set to indicate that the wedge ID complete (WC) is invalid. Further, the confidence count (CC) is set to the confidence count minimum (CCN) and the wedge ID acquire flag (WA) is set.

On the other hand, if at step 716 it is determined that the confidence count (CC) is less than the confidence count minimum (CCN), then similarly, at step 724, the wedge ID error flag (WE) is set to indicate that the wedge ID complete (WC) is invalid. Further, the confidence count (CC) is set to the confidence count minimum (CCN) and the wedge ID acquire flag (WA) is set.

It should be noted that although the previously described error recovery method was discussed with reference to utilizing combined wedge ID code words based on the cyclic coding sequence for predictions, the method could just as easily utilize decoded wedge ID codes of the decoded wedge ID code sequence or the sequential unique wedge ID number themselves for prediction purposes, as all of these sequences are interrelated to one another, as previously discussed.

The methods previously discussed can be employed for disk drives with an embedded servo system. Numerous alternative methods for RMSDs with similar or other media format characteristics can be employed by those skilled in the art to use the invention with equal advantage to implement reduced bit number wedge identification techniques. Further, although the embodiments have been described in the context of a disk drive with embedded servo sectors, the invention can be employed in many different types of RMSDs having a head actuator scanning the media.

We claim:

1. A rotating media storage device (RMSD) connectable to a host computer, the RMSD comprising:
   a moveable head to perform track following; and
   a disk having a circumferential track, the circumferential track having a plurality of embedded servo wedges utilized in track following, the plurality of wedges being spaced sequentially around a circumference of the circumferential track;
   wherein a substantial majority of the plurality of embedded servo wedges are modified to be reduced in size and to include a reduced bit servo wedge ID field that does not have a sufficient number of bits to uniquely identify the wedge within the track.

2. The RMSD of claim 1, further comprising a microprocessor for controlling operations in the RMSD including track following and wedge identification operations, the microprocessor under the control of a program to, a. read a first reduced bit wedge ID field of a first embedded servo wedge to obtain a first reduced bit wedge ID number;

b. read a second reduced bit wedge ID field of a second embedded servo wedge to obtain a second reduced bit wedge ID number; and c. form a combined wedge ID code word from at least the read first and second reduced bit wedge ID numbers for use in uniquely identifying the wedge.

3. The RMSD of claim 2, wherein the microprocessor further associates the combined wedge ID code word with a unique wedge ID number of the track.

4. The RMSD of claim 3, wherein associating the combined wedge ID code word with a unique wedge ID number further includes associating the combined wedge ID code word with a decoded wedge ID code of a decoded wedge ID code sequence.

5. The RMSD of claim 4, wherein associating the combined wedge ID code word with a unique wedge ID number further includes associating the decoded wedge ID code with the unique wedge ID number.

6. The RMSD of claim 5, further comprising a look-up table, wherein associating the decoded wedge ID code with the unique wedge ID number further includes associating the decoded wedge ID code in the look-up table with the unique wedge ID number.

7. The RMSD of claim 5, wherein the decoded wedge ID code sequence is based on a cyclic bit coding sequence.

8. The RMSD of claim 7, wherein the first and second reduced bit wedge ID numbers are adjacent segments of the cyclic bit coding sequence, respectively.

9. The RMSD of claim 2, further comprising a history buffer to store the first and second reduced bit wedge ID numbers.

10. The RMSD of claim 2, further comprising a confidence counter used in performing error recovery.

11. The RMSD of claim 10, wherein if a read reduced bit wedge ID field is not equal to a predicted reduced bit wedge ID field, the confidence counter is reduced in value.

12. The RMSD of claim 10, wherein if a read reduced bit wedge ID field is equal to a predicted reduced bit wedge ID field, the confidence counter is increased in value.

13. The RMSD of claim 10, wherein if a wedge acquire flag is set indicating that a full wedge ID is incomplete, then a wedge ID complete value is continued to be formed and the confidence counter is increased in value.

14. In a rotating media storage device (RMSD) connectable to a host computer, the RMSD including a disk having a circumferential track with a plurality of embedded servo wedges utilized in track following, the plurality of wedges being spaced sequentially around a circumference of the circumferential track, wherein a substantial majority of the plurality of embedded servo wedges are modified to be reduced in size and to include a reduced bit servo wedge ID field that does not have a sufficient number of bits to uniquely identify the wedge within the track, a moveable head to perform track following, and a microprocessor for controlling operations in the RMSD including track following, a method for uniquely identifying a wedge with the track, the method comprising the steps of:

a. reading a first reduced bit wedge ID field of a first embedded servo wedge to obtain a first reduced bit wedge ID number;

b. reading a second reduced bit wedge ID field of a second embedded servo wedge to obtain a second reduced bit wedge ID number; and c. forming a combined wedge ID code word from at least the read first and second reduced bit wedge ID numbers for use in uniquely identifying the wedge.

15. The method of claim 14, further comprising associating the combined wedge ID code word with a unique wedge ID number of the track.

16. The method of claim 15, wherein associating the combined wedge ID code word with a unique wedge ID number further comprises associating the combined wedge ID code word with a decoded wedge ID code of a decoded wedge ID code sequence.

17. The method of claim 16, wherein associating the combined wedge ID code word with a unique wedge ID number further comprises associating the decoded wedge ID code with the unique wedge ID number.

18. The method of claim 17, wherein associating the decoded wedge ID code with the unique wedge ID number further comprises associating the decoded wedge ID code in the look-up table with the unique wedge ID number.

19. The method of claim 17, wherein the decoded wedge ID code sequence is based on a cyclic bit coding sequence.

20. The method of claim 19, wherein the first and second reduced bit wedge ID numbers are adjacent segments of the cyclic bit coding sequence, respectively.

21. The method of claim 15, further comprising performing error recovery.

22. The method of claim 21, wherein if a read reduced bit wedge ID field is not equal to a predicted reduced bit wedge ID field, a confidence counter is reduced in value.

23. The method of claim 21, wherein if a read reduced bit wedge ID field is equal to a predicted reduced bit wedge ID field, further comprising increasing a confidence counter in value.

24. The method of claim 21, wherein if a wedge acquire flag is set indicating that a full wedge ID is incomplete, further comprising:

continuing to form a wedge ID complete value; and increasing a confidence counter in value.

25. A computer system comprising a host computer and a rotating media storage device (RMSD), the RMSD comprising:

a moveable head to perform track following; and a disk having a circumferential track, the circumferential track having a plurality of embedded servo wedges utilized in track following, the plurality of wedges being spaced sequentially around a circumference of the circumferential track;

wherein a substantial majority of the plurality of embedded servo wedges are modified to be reduced in size and to include a reduced bit servo wedge ID field that does not have a sufficient number of bits to uniquely identify the wedge within the track.

26. The computer system of claim 25, further comprising a microprocessor for controlling operations in the RMSD including track following and wedge identification operations, the microprocessor under the control of a program to, a. read a first reduced bit wedge ID field of a first embedded servo wedge to obtain a first reduced bit wedge ID number;

b. read a second reduced bit wedge ID field of a second embedded servo wedge to obtain a second reduced bit wedge ID number; and c. form a combined wedge ID code word from at least the read first and second reduced bit wedge ID numbers for use in uniquely identifying the wedge.

27. The computer system of claim 26, wherein the microprocessor further associates the combined wedge ID code word with a unique wedge ID number of the track.

28. The computer system of claim 27, wherein associating the combined wedge ID code word with a unique wedge ID number further includes associating the combined wedge ID code word with a decoded wedge ID code of a decoded wedge ID code sequence.

29. The computer system of claim 28, wherein associating the combined wedge ID code word with a unique wedge ID number further includes associating the decoded wedge ID code with the unique wedge ID number.

30. The computer system of claim 29, further comprising a look-up table, wherein associating the decoded wedge ID code with the unique wedge ID number further includes associating the decoded wedge ID code in the look-up table with the unique wedge ID number.

31. The computer system of claim 29, wherein the decoded wedge ID code sequence is based on a cyclic bit coding sequence.

32. The computer system of claim 31, wherein the first and second reduced bit wedge ID numbers are adjacent segments of the cyclic bit coding sequence, respectively.

33. The computer system of claim 26, further comprising a history buffer to store the first and second reduced bit wedge ID numbers.

34. The computer system of claim 26, further comprising a confidence counter used in performing error recovery.

35. The computer system of claim 34, wherein if a read reduced bit wedge ID field is not equal to a predicted reduced bit wedge ID field, the confidence counter is reduced in value.

36. The computer system of claim 34, wherein if a read reduced bit wedge ID field is equal to a predicted reduced bit wedge ID field, the confidence counter is increased in value.

37. The computer system of claim 34, wherein if a wedge acquire flag is set indicating that a full wedge ID is incomplete, then a wedge ID complete value is continued to be formed and the confidence counter is increased in value.

* * * * *